(12) United States Patent
Pearson et al.

(10) Patent No.: US 7,499,532 B2
(45) Date of Patent: Mar. 3, 2009

(54) METHOD AND SYSTEM FOR COMMUNICATING INFORMATION TO A CALLER ON A TELEPHONE NETWORK BY SUPERIMPOSING AN AUDIBLE INFORMATION MESSAGE OVER A DIAL TONE

(75) Inventors: Larry B. Pearson, San Antonio, TX (US); John C. Nolan, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 929 days.

(21) Appl. No.: 10/604,701

(22) Filed: Aug. 11, 2003

(65) Prior Publication Data

US 2005/0036590 A1 Feb. 17, 2005

(51) Int. Cl.
*H04M 11/00* (2006.01)
*H04M 3/00* (2006.01)

(52) U.S. Cl. .............. 379/90.01; 379/93.31; 379/93.32; 379/88.25

(58) Field of Classification Search .............. 379/90.01, 379/93.32, 93.31, 88.25, 88.2, 88.23, 257, 379/377, 220.01, 207.02, 212.01, 229, 198
See application file for complete search history.

(56) References Cited

U.S. PATENT DOCUMENTS

| | | | |
|---|---|---|---|
| 4,930,154 A | 5/1990 | Bauer et al. | |
| 5,034,947 A * | 7/1991 | Epps | 370/268 |
| 5,056,134 A | 10/1991 | Bauer et al. | |
| 5,091,904 A | 2/1992 | Back et al. | |
| 5,331,632 A | 7/1994 | Aaron et al. | |
| 5,535,264 A * | 7/1996 | Starr et al. | 379/88.25 |
| 5,539,809 A | 7/1996 | Mayer et al. | |
| 5,652,784 A | 7/1997 | Blen et al. | |
| 5,661,781 A | 8/1997 | DeJager | |
| 5,970,133 A | 10/1999 | Salimando | |
| 6,069,890 A | 5/2000 | White et al. | |

(Continued)

FOREIGN PATENT DOCUMENTS

JP          406284204 A  * 10/1994

OTHER PUBLICATIONS

Newton, Harry; Newton's Telecom Dictionary; 2003; pp. 239; 19th Updated, Improved and Expanded Edition; CMP Books; San Francisco, CA.

(Continued)

*Primary Examiner*—Melur Ramakrishnaiah
(74) *Attorney, Agent, or Firm*—Toler Law Group

(57) ABSTRACT

A method for communicating information to a caller on a telephone network is herein proposed. The method includes the steps of (a) generating a signal suitable for producing an audible dial tone, (b) transmitting the signal to the receiver of a telephone set, when the caller initially takes the receiver off-hook, to thereby produce the audible dial tone, and (c) superimposing an audible information message over the audible dial tone while the audible dial tone is produced. The audible information message may, for example, be a branding-type message that identifies a provider of local telephone service to a caller. The audible information message may be superimposed over the audible dial tone in a whisper-like or low-decibel manner to avoid interfering with modems that operate on a "wait for dial tone" (WFDT) basis.

20 Claims, 5 Drawing Sheets

U.S. PATENT DOCUMENTS

| | | | |
|---|---|---|---|
| 6,137,874 | A | 10/2000 | Brown et al. |
| 6,157,709 | A * | 12/2000 | Lawser et al. ......... 379/220.01 |
| 6,173,051 | B1 | 1/2001 | Lipchock et al. |
| 6,389,117 | B1 * | 5/2002 | Gross et al. ............. 379/88.23 |
| 6,442,244 | B1 | 8/2002 | Fellingham |
| 6,453,153 | B1 | 9/2002 | Bowker et al. |
| 6,633,635 | B2 * | 10/2003 | Kung et al. ............ 379/215.01 |
| 7,266,184 | B1 * | 9/2007 | Link et al. ............... 379/93.24 |
| 2003/0007625 | A1 | 1/2003 | Pines et al. |

OTHER PUBLICATIONS

"5ESS® System Upgrade Services," Apr. 1999, 6 pages, Lucent Technologies Bell Labs Innovations, USA.

"5ESS® Switch Display Services," Copyright 2003, 1 page, Lucent Technologies Bell Labs Innovations, USA.

"TDS installs first AT&T 5ESS-2000 compact digital exchange," News Release issued jointly by TDS TELECOM Inc., and AT&T Network Systems, May 3, 1994, 3 pages.

"Definitions," Copyright 2002, 4 pages, Western Independent Networks, from the website: www.win-networks.com/Definitions.html.

"Flyweight," Copyright 2003, 2 pages, Lucent Technologies Inc., from the website: www.agcs.com/supportv2/techpapers/patterns/papers/tutnotes/s1d016.htm.

"Telecommunications Fundamentals, Chapter 4A: Fundamentals of Switching," 15 pages, Telecom/Writing.com, from the website: http://www.privateline.com/manual/fourA.html.

"SM-2000 (Switching Module 2000)," Copyright 2003, 1 page, Lucent Technologies Bell Labs Innovation, USA.

"5ESS Telephone Switching System," Nov. 27, 2002, 3 pages, from the website: http://web.mit.edu/is/tel/5ess.html.

* cited by examiner

US 7,499,532 B2

METHOD AND SYSTEM FOR COMMUNICATING INFORMATION TO A CALLER ON A TELEPHONE NETWORK BY SUPERIMPOSING AN AUDIBLE INFORMATION MESSAGE OVER A DIAL TONE

BACKGROUND OF INVENTION

The present invention generally relates to both local exchanges and private branch exchanges situated and connected within a telephone network. The present invention more particularly relates to communicating information, for example, an audible branding-type message, to a caller via the receiver on a telephone set within a telephone network.

With passage of the Telecommunications Act of 1996 into law, Congress thereby attempted to promote competition amongst local telephone companies and also reduce regulation. In this way, Congress hoped to secure both lower prices and higher quality services for American telephone service subscribers. To help increase competition, particularly on the local level in certain highly-populated metropolitan areas, the Act generally required existing local telephone companies, referred to as "incumbent local exchange carriers" (ILECs), to lease and share their local loops and certain related phone service equipment to new start-up local telephone companies, referred to as "competitive local exchange carriers" (CLECs), who sought to enter into the telecommunications market. The theory behind such legislation was that the new start-up local telephone companies would, over time, eventually wean themselves away from leasing and utilizing the existing local telephone companies" local loops and phone service equipment by building and installing their own loops and equipment. In this way, according to theory, new local telephone companies would ultimately build and develop new state-of-the-art phone systems and related services that would eventually fully and successfully compete with those being provided by existing local telephone companies.

Soon after the passage of the Telecommunications Act of 1996, many new start-up local telephone companies did indeed quickly emerge. Although many of these new local telephone companies failed to weather the "telecom bust" of late 2000 and early 2001, some have survived. Hence, a modest increase in competition amongst local telephone companies to attract both commercial and residential telephone service subscribers has indeed been realized in some geographical areas. Given such local competition in these areas, however, it is often inapparent to a phone service subscriber or caller when picking up the receiver of a telephone set which local telephone company is actually providing him with the audible dial tone through the receiver (i.e., local telephone service).

In order to eliminate any confusion within a caller's mind as to the actual identity of his local telephone service provider, uniquely adapting the commercially known practice of "branding" to inform or remind a caller of the identity of his local telephone service provider seems to be a viable potential solution. Branding, in particular, is a practice within the telecommunications industry wherein the commercial identity of a service provider is audibly communicated to a caller through the receiver of a telephone phone set. Branding has been especially and commonly utilized to identify long distance carriers. For example, if a person were to dial a long distance phone number from a hotel room, that person generally would not know the actual identity of the long distance telephone company that is carrying or servicing his call. When, however, an audible branding message such as "Thank you for using [long distance phone company name]" is communicated to the person through the receiver of the telephone set that he is using, the person then affirmatively knows the identity of the long distance telephone company that is servicing his call.

If the commercial practice of branding were to be uniquely adapted to inform a caller as to the identity of his local telephone service provider, the ideal time to communicate an audible branding-type message to the caller would be just after the caller takes the receiver of his telephone set off-hook. In this way, as the caller initially puts the receiver to his ear to listen for a dial tone before dialing a desired phone number, the caller would be briefly informed or reminded of the identity of his local telephone service provider. If such a branding timing scheme were to be adopted, however, there looms the problem of possibly interfering with the operation of a modem should a modem, instead of a human being, take on the role of caller. For example, if a modem associated with either a personal computer (PC) or a facsimile (fax) machine were to initially take a phone line off-hook for the intended purpose of thereafter sending data signals through the phone line to an intended recipient, any audible branding-type message that would be automatically communicated to the modem upon taking the phone line off-hook may potentially interfere with the operation of the modem. In particular, a typical modem is set up to operate on a "wait for dial tone" (WFDT) basis so that when the modem takes a phone line off-hook (i.e., picks up a phone line), the modem specifically waits and "listens" for a dial tone before dialing the phone number of its intended recipient of data. Thus, if such a modem were to take a phone line off-hook and wait for a dial tone, any audible brandingtype message received at that point in time may potentially and undesirably (1) "confuse" the modem and cause it to hang up the phone line, (2) cause the modem to lock up, or (3) force the modem to wait until the message is completely finished before allowing the modem to "hear" a clear dial tone and proceed to dial.

In light of the above, there is a present need in the art for a method and/or system that can audibly communicate information, for example, information identifying a local telephone service provider, to a caller on a telephone network without interfering with the operation of modems that are activated on a "wait for dial tone" (WFDT) basis.

BRIEF DESCRIPTION OF DRAWINGS

The present invention will be described, by way of example, with reference to the following drawings.

DETAILED DESCRIPTION

The present invention provides both a method and system for communicating information to a caller on a telephone network. The method, first of all, basically includes the steps of (a) generating a signal suitable for producing an audible dial tone, (b) transmitting the signal to the receiver of a telephone set, when the caller initially takes the receiver off-hook, to thereby produce the audible dial tone, and (c) superimposing an audible information message over the audible dial tone while the audible dial tone is produced. To physically implement the method, the system basically includes (a) a dial tone generator and (b) an electronic circuit having a memory storing an audible information message in digital format. Within the system, both the dial tone generator and the electronic circuit are capable of being set in switchable communication with a telephone set.

Given the present invention, an audible information message produced thereby may, for example, be made to be a branding-type message that serves to positively identify a provider of local telephone service to a caller. In this way, different providers of local telephone service at different public or private exchanges can successfully identify themselves to callers and telephone service subscribers, thereby facilitating an accurate association of local telephone service quality with a particular provider. Furthermore, the audible information message may be superimposed over the audible dial tone in a whisper-like or lowdecibel manner. In this way, the audible dial tone is not altogether drowned out or audibly masked by the audible information message. As a result, unintended interference with the sensitive operation of modems that are activated on a "wait for dial tone" (WFDT) basis is avoided.

Figure 1:
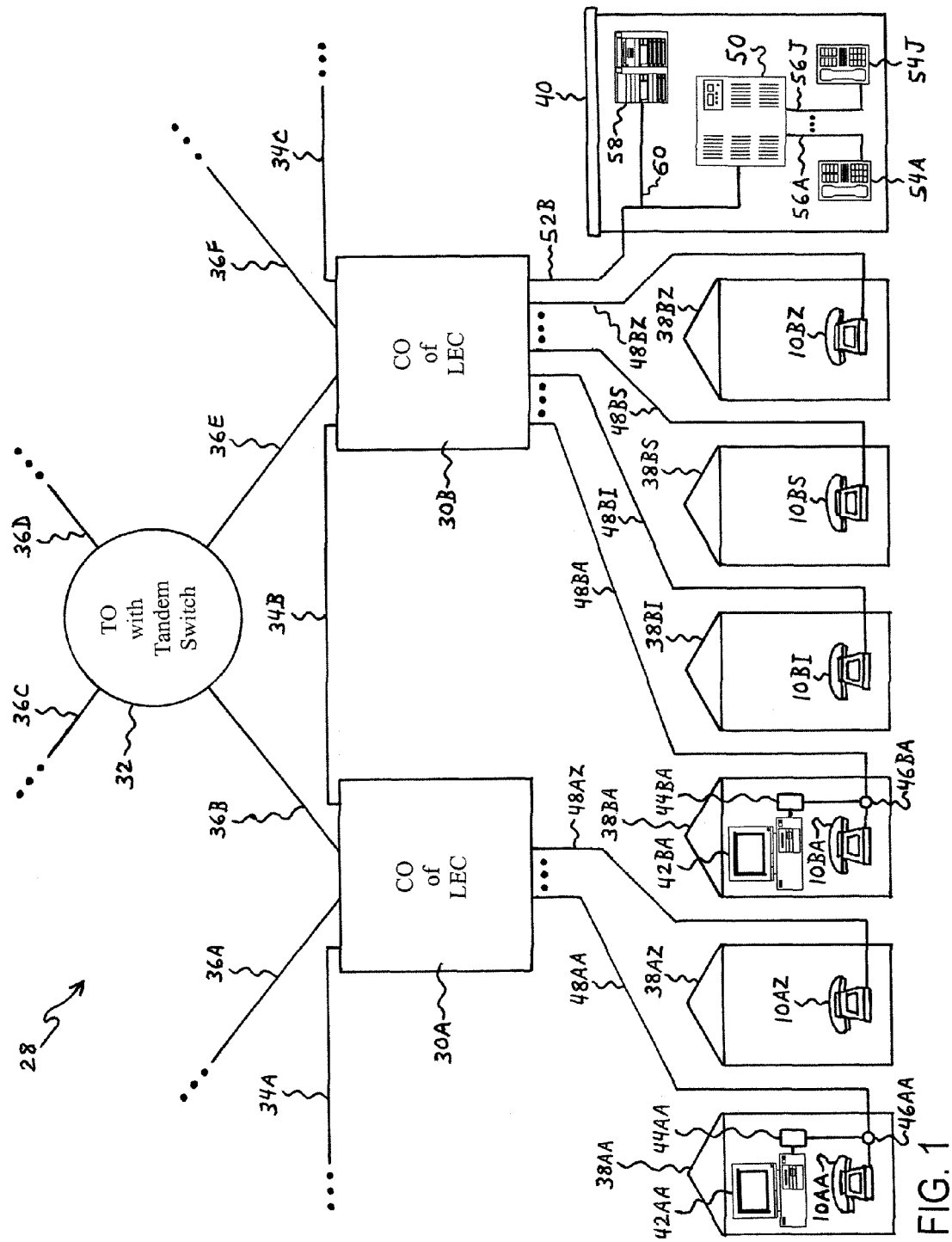
FIG. 1 is an illustration of a section of a telephone network that is suitable for incorporating therein various possible embodiments of a system according to the present invention, wherein the telephone network is shown to include central offices (COs) of local exchange carriers (LECs) that provide local telephone service to both residential and commercial subscribers.

For the purpose of exemplification, FIG. 1 illustrates a section of a telephone network 28. The telephone network 28 is suitable for incorporating therein various possible embodiments of a system 130 (see FIG. 4) according to the present invention. In addition, the telephone network 28 may incorporate, or be incorporated within, the Public Switched Telephone Network (PSTN) or other similar type of telephone network. The telephone network 28 itself generally includes, first of all, a plurality of central offices (COs). Each central office serves as a public or local exchange wherein telecommunications switching hardware and related equipment is situated and maintained. The switching hardware is suited for selectively call-connecting local residential and commercial telephone service subscribers to other subscribers situated either locally or at long distances away. As illustrated in FIG. 1, the telephone network 28 includes a plurality of central offices that particularly includes central offices 30A and 30B. The two central offices 30A and 30B may, in one possible scenario, be owned and operated by the same local exchange carrier (LEC) or telephone company. In another possible scenario, however, the two central offices 30A and 30B may instead be owned and operated by two different local exchange carriers or telephone companies. In general, when either of any two subscribers receiving local telephone service from the same central office attempts to call the other subscriber, the two subscribers are call-connected through that very same central office. For example, in FIG. 1, if a subscriber in residence 38AA were to call a subscriber in residence 38AZ, the call would simply be connected through the central office 30A. Similarly, if a subscriber in residence 38BA were to call a subscriber in residence 38BZ, the call would simply be connected through the central office 30B.

In addition to central offices, the telephone network 28 also generally includes a plurality of interoffice or direct trunks. As illustrated in FIG. 1, for example, the telephone network 28 particularly includes a direct trunk 34B that directly links the two central offices 30A and 30B together. This direct trunk 34B serves as an interconnecting telecommunications transmission means which enables the two central offices 30A and 30B to cooperatively route phone calls between their respective telephone service subscribers. For example, if a subscriber in residence 38AZ desires to utilize his telephone set 10AZ to call a subscriber in residence 38BI on her telephone set 10BI, the direct trunk 34B enables the two central offices 30A and 30B to successfully establish a connection between the two telephone sets 10AZ and 10BI so that the subscribers in residences 38AZ and 38BI can communicate with each other. Furthermore, in addition to the direct trunk 34B, the telephone network 28 also includes other direct trunks such as, in particular, direct trunks 34A and 34C. The direct trunks 34A and 34C enable the two central offices 30A and 30B to cooperatively route phone calls between their own subscribers and other subscribers being directly serviced by other central offices (not shown in FIG. 1) within the telephone network 28. In general, the direct trunks 34A through 34C may each be implemented with four-wire copper, coaxial, microwave, or fiber optic technology, or even combinations thereof. In FIG. 1, however, the direct trunks 34A through 34C are primarily implemented with state-of-the-art fiber optic technology.

In addition to central offices and direct trunks, the telephone network 28 also generally includes a plurality of tandem offices (TOs) along with an associated plurality of tandem trunks. In general, the phone lines (i.e., local loops) of telephone service subscribers are not directly connected to the tandem offices themselves but are in stead indirectly connectable to the tandem offices. As illustrated in FIG. 1, for example, the telephone network 28 particularly includes a tandem office (TO) 32 along with tandem trunks 36A through 36F. The tandem office 32 and the tandem trunks 36A through 36F together serve as additional telecommunications transmission means for interconnecting the central offices 30A and 30B along with any other central offices within the telephone network 28. The tandem office 32 itself, first of all, includes one or more tandem switches and related switching hardware therein for serially and selectively connecting two of the tandem trunks 36B through 36E between two central offices which may include either or both of the central offices 30A and 30B. The tandem trunks 36A through 36F, in turn, may generally each be implemented with four-wire copper, coaxial, microwave, or fiber optic technology, or even combinations thereof. In FIG. 1, however, the tandem trunks 36A through 36F are primarily implemented with state-of-the-art fiber optic technology. Given such tandem offices and tandem trunks, a call placed between subscribers directly serviced by two different central offices within the telephone network 28 may therefore be alternatively and simply routed via one or more of the tandem trunks 36A through 36F instead of being routed through a potentially long and circuitous series of central offices interlinked with direct trunks.

As illustrated in FIG. 1, the central office 30A provides local telephone service to a plurality of residential subscribers including, in particular, subscribers occupying residences 38AA through 38AZ. Similarly, the central office 30B provides local telephone service to a plurality of residential subscribers including, in particular, subscribers occupying residences 38BA through 38BZ. In general, such local telephone service is actually made available to each residential subscriber via telecommunications transmission means that includes one or more different types of transmission media. Such different types of transmission media may include, for example, a twisted pair of copper conductors, a fiber optic cable, a coaxial cable, microwave signals, or even combinations thereof. Each such telecommunications transmission means that successfully provides complete local telephone service to a particular subscriber is commonly referred to as a "subscriber line," "subscriber loop," or "local loop." Given such, therefore, the central office 30A in FIG. 1 more particularly provides local telephone service to the subscribers of residences 38AA through 38AZ via local loops 48AA through 48AZ, wherein the local loops 48AA through 48AZ themselves are set in communication with the telephone sets 10AA through 10AZ within residences 38AA through 38AZ. Within residence 38AA, the local loop 48AA is also set in communication with a personal computer (PC) 42AA via an external modem 44AA. A switch 46AA enables the telephone set 10AA and the personal computer 42AA to share the same local loop 48AA. Similarly, the central office 30B in FIG. 1 more particularly provides local telephone service to the subscribers of residences 38BA through 38BZ via local loops 48BA through 48BZ, wherein the local loops 48BA through 48BZ themselves are set in communication with the telephone sets 10BA through 10BZ within residences 38BA through 38BZ. Within residence 38BA, the local loop 48BA is also set in communication with a personal computer (PC) 42BA via an external modem 44BA. A switch 46BA enables the telephone set 10BA and the personal computer 42BA to share the same local loop 48BA.

Figure 2:
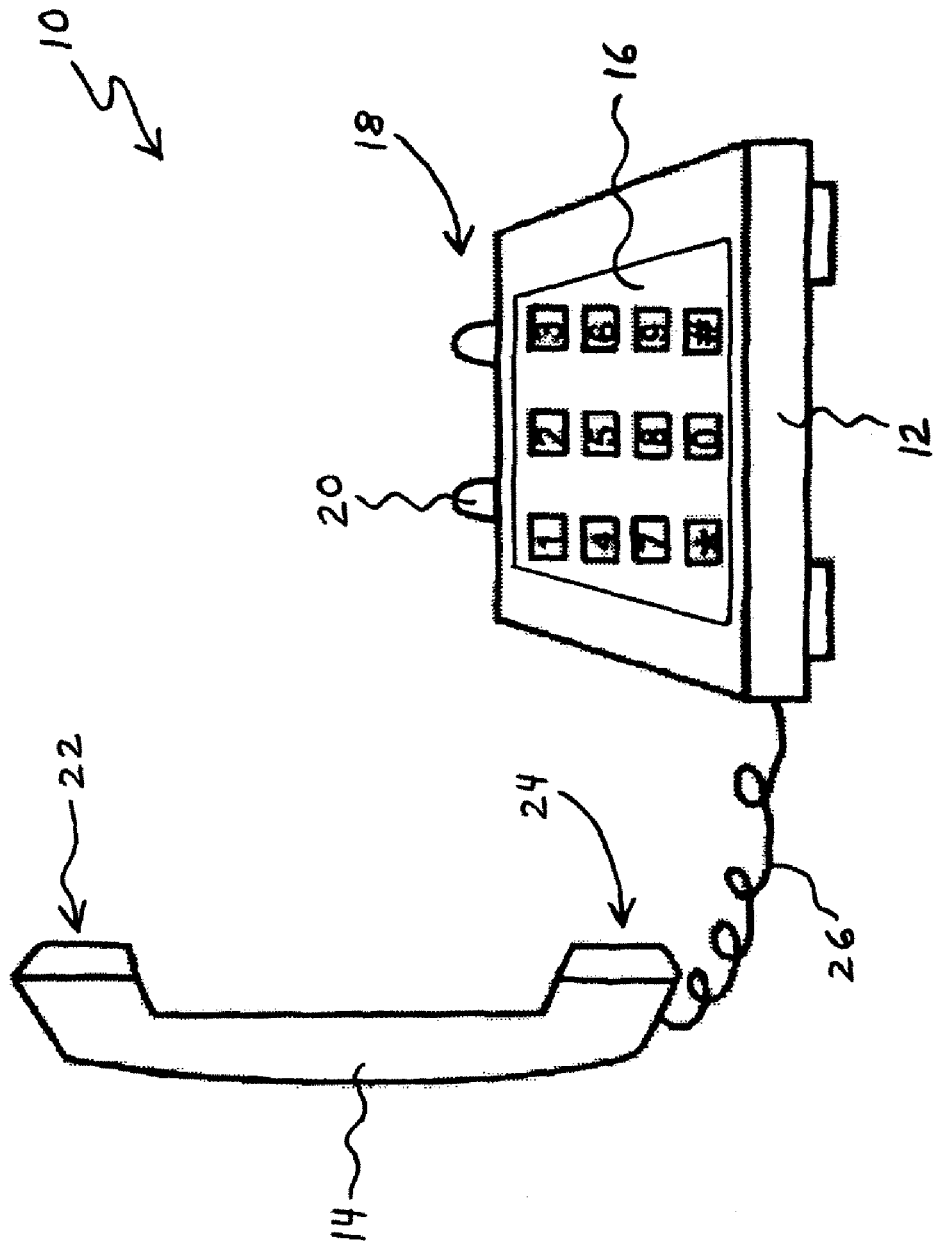
FIG. 2 is an illustration of a conventional telephone set that is compatible with various possible embodiments of the system according to the present invention.

Each telephone set 10AA through 10BZ incorporated within the telephone network 28 of FIG. 1 is generally a conventional telephone set 10 as illustrated in FIG. 2. Such a conventional telephone set 10, in the present example, may be an analog or POTS ("plain old telephone service") type telephone set. It is, however, to be understood that a system 130 (see FIG. 4) according to the present invention may indeed be adapted to operate with other types of telephone sets including, for example, various electronic telephone sets, digital telephone sets, VoIP (Voice over Internet Protocol) telephone sets, ISDN (Integrated Services Digital Network) telephone sets, and proprietary telephone sets. As generically depicted, the conventional telephone set 10 in FIG. 2 generally includes both a base unit 12 and a handset 14. The base unit 12 primarily includes a cradle 18, a plungeable hookswitch 20, and a touch-tone pad 16. The cradle 18, first of all, generally serves as a fitted resting place for the handset 14. The plungeable hookswitch 20, secondly, is situated within the cradle 18 such that whenever the handset 14 is properly resting in the cradle 18, the hookswitch 20 is thereby depressed and plunged into the base unit 12. In such a case, the handset 14 is said to be "on the hook," and the hookswitch 20 is said to be in an "on-hook" position. Within such an on-hook position, the depressed hookswitch 20 is immovably biased against the resting handset 14. When, on the other hand, the handset 14 is lifted away from the cradle 18, the hookswitch 20 is thereby released such that it protrudes out from the cradle 18 of the base unit 12. In such a case, the handset 14 is said to be "off the hook," and the hookswitch 20 is said to be in an "off-hook" position. The touch-tone pad 16, last of all, includes twelve push buttons that produce dual-tone multiple frequency (DTMF) tones suitable for dialing a desired phone number.

To functionally cooperate with the base unit 12, the handset 14 primarily includes both a receiver 22 and a transmitter 24. The receiver 22 and the transmitter 24 are generally situated within opposite ends of the handset 14. The receiver 22 includes a built-in speaker with which a phone user or caller may use to audibly detect a dial tone, listen to electronic or pre-recorded messages, or hear the real-time voices of other phone users connected to the telephone network 28. The transmitter 24, in contrast, includes a built-in microphone that can be utilized by a phone user or caller to speak into in order to communicate with another phone user connected to the telephone network 28. Within such an arrangement, telecommunication between the handset 14 and the base unit 12 is made possible by a cord 26 interconnected between the handset 14 and the base unit 12.

It is to be understood that if the conventional telephone set 10 of FIG. 2 were alternatively a cordless type telephone set, the touch-tone pad 16 would then be built into the handset 14 instead of, or in addition to, being built into the base unit 12. In such an alternative embodiment, telecommunication between the handset 14 and the base unit 12 is made possible via a short-range radio link establishable between the handset 14 and the base unit 12. To establish such a radio link, the handset 14 and the base unit 12 are both equipped with radio wave transmitters, receivers, and/or transceivers. Equipped with such, the handset 14 and the base unit 12 are designed so that a radio link is established whenever, for example, the handset 14 is removed from the cradle 18 of the base unit 12 and a "TALK" push button on the handset 14 is pressed. Furthermore, in addition to such a cordless telephone set, it is to be understood that many alternative cordless or wireless embodiments of the conventional telephone set 10 are both available and suitable for use with the system 130 (see FIG. 4) according to the present invention. In particular, for example, the system 130 according to the present invention may be adapted and made suitable for use with cellular phone systems.

In addition to providing local telephone service to residential subscribers, one or more of the central offices within the telephone network 28 also provide local telephone service to one or more commercial subscribers. In FIG. 1, for example, the central office (CO) 30B is particularly shown to provide local telephone service to a commercial subscriber situated within a business building 40. Such local telephone service is specifically provided via at least one local trunk 52B that may include, for example, digital transmission Trunk Level 1 (T–1) technology or other similar type of technology. The local trunk 52B itself is generally set in communication with a facsimile (fax) machine 58 and also a private branch exchange (PBX) 50, which are both set up within the business building 40. The local trunk 52B is particularly set in communication with an internal modem situated within the facsimile machine 58 via a dedicated line 60 that is provided by and/or routed along with the local trunk 52B itself. In addition, the local trunk 52B is also particularly set in communication with the private branch exchange 50 via a trunk unit (TU) physically mounted to or within the private branch exchange 50 itself. In general, the private branch exchange 50 is a private telephone switching system that is subscriber-owned or leased and located at a subscriber-designated site or premises. The private branch exchange 50 primarily includes a cabinet with backplane (sometimes called a "key service unit") that houses a core central processing unit (CPU), switching electronics and hardware, the aforementioned trunk unit with a trunk card, line interface units (LIUs) with line cards, and a pool of special-function printed circuit (PC) cards. Multiple electronic telephone sets 54A through 54J are connected to the backplane of the private branch exchange 50 via extension lines 56A through 56J, the line interface units with line cards, and various connectors. Within such a configuration, the private branch exchange 50 is thereby capable of establishing intra-office or internal call connections between any two of the electronic telephone sets 54A through 54J. In addition to such internal connections, the private branch exchange 50 is also capable of helping establish, in cooperation with the central office 30B, external call connections between any one of the electronic telephone sets 54A through 54J and any external telephone set situated and connected within the telephone network 28.

Figure 3:
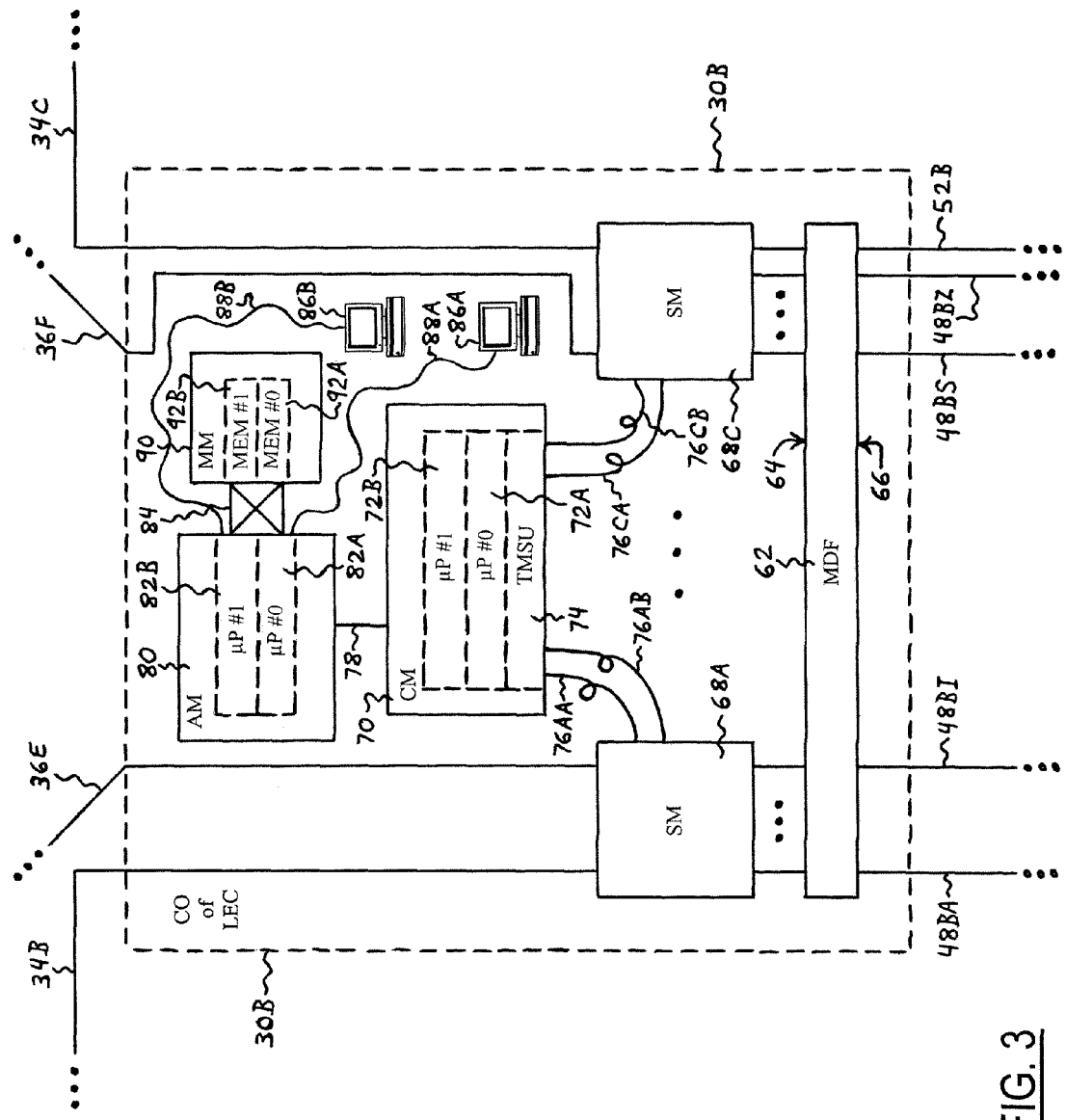
FIG. 3 is a more detailed illustration of one of the central offices illustrated in FIG. 1, wherein the central office is particularly shown to include a plurality of switch modules (SMs).

In FIG. 3, the central office 30B of FIG. 1 is illustrated in more detail. In particular, the central office 30B is shown to include a main distribution frame (MDF) 62 along with a switching system. The main distribution frame 62, first of all, is essentially a large and sturdy frame, typically made of iron, having both a vertical side 66 and a horizontal side 64. As such, the main distribution frame 62 serves to provide physical support for interconnecting the lines of local loops 48BA through 48BZ and the local trunk 52B to a plurality of switch modules (SMs) 68A through 68C included within the switching system. The switching system, in turn, is a digitally-based switching system such as the Number 5 Electronic Switching System (5ESS®) produced by Lucent Technologies Incorporated of Murray Hill, N.J. It is to be understood, however, that other switching systems may instead be utilized in accordance with the present invention as well. Such other switching systems may include, for example, the DMS (Digital Multiplex System) Local Switching System produced by Northern Telecom (Nortel) Networks Corporation of Brampton, Ontario.

The Lucent-based switching system particularly depicted in FIG. 3 generally includes, in sum, the aforementioned plurality of switch modules (SMs) 68A through 68C, a communications module (CM) 70, an administrative module (AM) 80, and a main memory (MM) 90. The switch modules 68A through 68C, first of all, generally serve as termination points for both trunks and the lines of local loops, perform transmission quality tests on both trunks and the lines of local loops, and utilize scanners to scan both trunks and the lines of local loops in order to determine when subscribers" telephone sets or modems are on or off the hook. In addition, the switch modules 68A through 68C also generate dial tones for callers, detect dual-tone multiple frequency (DTMF) tones received via trunks and local loops from subscribers' telephone sets or modems, and perform call processing and "connection" functions. Furthermore, the switch modules 68A through 68C also trigger the ringing of subscribers" telephone sets, perform both analog-to-digital (A/D) and digital-to-analog (D/A) voice signal conversions, perform time-division switching of time slot interchangers (TSIs), and communicate busy signals to callers.

As illustrated in FIG. 3, the communications module (CM) 70, in turn, is generally interconnected between the administrative module (AM) 80 and the switch modules (SMs) 68A through 68C. More particularly, the communications module 70 is, first, directly connected to the administrative module 80 via a controls interface 78. Second, the communications module 70 is also directly connected to each of the switch modules 68A through 68C with a separate pair of fiber optic links 76AA through 76CA and 76AB through 76CB. Such fiber optic links 76AA through 76CA and 76AB through 76CB are sometimes referred to as "network, control, and timing" (NCT) links. The communications module 70 itself primarily includes a time-multiplexed switch unit (TMSU) 74, a primary processor (µP #0) 72A, and a duplicate (i.e., backup) processor (µP #1) 72B. Within such a configuration, the communications module 70 generally facilitates software messaging amongst the control processors of the switch modules 68A through 68C, facilitates software messaging between the control processors of the administrative module 80 and the switch modules 68A through 68C, and facilitates synchronization of the overall operation of the switching system. With particular regard to such synchronization, the communications module 70 utilizes the primary processor 72A to assist the switch modules 68A through 68C in call processing and "connection" functions, specifically utilizes the time-multiplexed switch unit 74 to establish talk paths and call connections between the time slot interchangers (TSIs) of any two of the switch modules 68A through 68C, and utilizes both the primary processor 72A and the time-multiplexed switch unit 74 to switch both subscriber traffic (i.e., data time slots) amongst the switch modules 68A through 68C and software messages (i.e., control time slots) between the administrative module 80 and the switch modules 68A through 68C.

The administrative module (AM) 80, in turn, is generally connected to both the communications module (CM) 70 and the main memory (MM) 90. More particularly, the administrative module 80 is, first, directly connected to the communications module 70 via the aforementioned controls interface 78. Second, the administrative module 80 is also directly connected to the main memory 90 via a memory access interface 84. The administrative module 80 itself primarily includes a primary processor (µP #0) 82A, a duplicate (i.e., backup) processor (µP #1) 82B, a primary input/output (I/O) terminal 86A, and a backup in-put/output (I/O) terminal 86B. Both the primary processor 82A and the duplicate processor 82B, first of all, are 3B20D or 3B21 model UNIX® processors, which are particularly suitable for incorporation within this Lucent-based switching system. The primary input/output terminal 86A, in turn, is particularly connected to the administrative module 80 via a cable 88A such that the terminal 86A is in operational communication with the primary processor 82A. Similarly, the backup input/output terminal 86B is particularly connected to the administrative module 80 via a cable 88B such that the terminal 86B is in operational communication with the duplicate processor 82B. Within such a configuration, the administrative module 80 generally runs executable software programs that are preloaded and stored within the main memory 90. In executing the software programs, the administrative module 80 performs various administrative functions related to call processing within the switching system. Such administrative functions may include, for example, generating billing information, generating information regarding the operational and/or conditional status of hardware and/or software within the switching system, automatically generating switching system maintenance schedules, handling software messaging within the switching system, serving as a Signaling System 7 (SS7) network interface point for the overall switching system, and managing the high-level operations of the switching system. To facilitate such administrative functions, both the primary input/output terminal 86A and the backup input/output terminal 86B serve as interfaces for enabling human administrators to interact and communicate with the administrative module 80. In this way, for example, the aforementioned billing information, operational and/or conditional status information, and maintenance schedules can be obtained and/or addressed appropriately.

As further illustrated in FIG. 3, the main memory (MM) 90, last of all, is connected to the administrative module (AM) 80 via the aforementioned memory access interface 84. The main memory 90 itself includes both a primary memory (MEM #0) 92A and a duplicate (i.e., backup) memory (MEM #1) 92B. Within each of the memories 92A and 92B, one or more executable call-processing software programs is stored along with transient data and information necessary for carrying out administrative functions. Such transient data and information may include, for example, operational and conditional parameters or data, the data or program contents of various registers, and/or information or data regarding line and trunk call-routing translations. Given such, the memory access interface 84 is particularly connected between the main memory 90 and the administrative module 80 in a switchable manner such that any one of the two memories 92A and 92B within the main memory 90 can be directly connected to any one of the two processors 82A and 82B within the administrative module 80.

Figure 4:
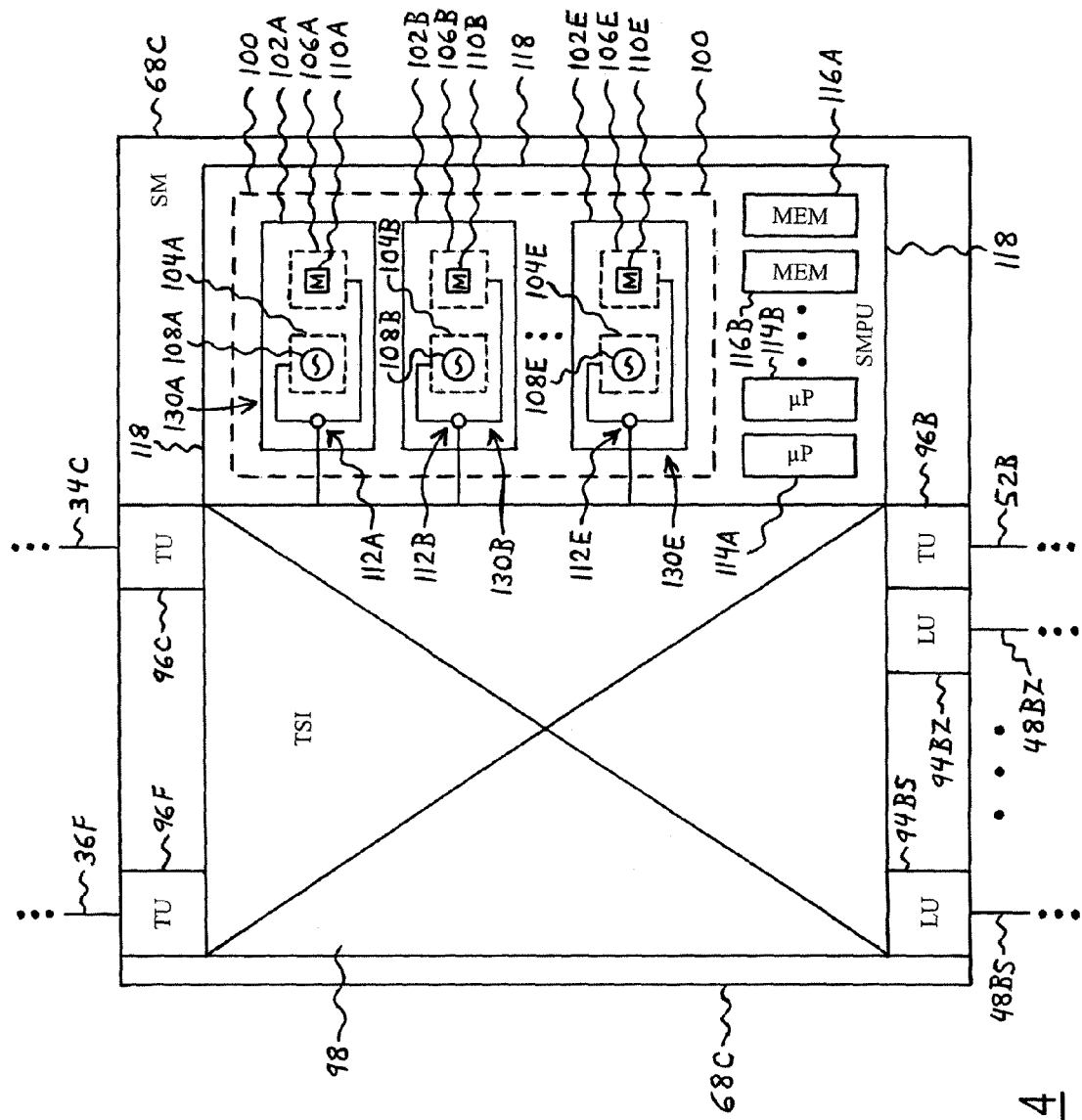
FIG. 4 is a more detailed illustration of one of the switch modules illustrated in FIG. 3, wherein the switch module is particularly shown to include a pool of specialfunction printed circuit cards that each include a system for communicating information to a caller on a telephone network according to one embodiment of the present invention.

In FIG. 4, the switch module (SM) 68C of FIG. 3 is illustrated in more detail. The switch module 68C itself is a SM-2000 Switch Module. The SM-2000 Switch Module has recently been developed by Lucent Technologies Incorporated and is particularly suitable for incorporation within the Lucent-based switching system described herein by way of example. It is to be understood, however, that the system 130 according to the present invention may easily be adapted and incorporated within other types of switch modules or switching systems produced by other manufacturers as well.

As illustrated in FIG. 4, the switch module 68C primarily includes at least one time slot interchanger (TSI) 98 and a switch module processor unit (SMPU) 118. The time slot interchanger 98, first of all, is set in electrical communication with the lines associated with local loops 48BS through 48BZ via line units (LU) 94BS through 94BZ. The line units 94BS through 94BZ generally include printed circuit (PC) cards with ports. The lines associated with local loops 48BS through 48BZ extending from the horizontal side 64 of the main distribution frame 62 are both received and physically terminated within the ports of the printed circuit cards. Hence, these printed circuit cards within the line units 94BS through 94BZ are frequently referred to as "line-termination cards" or simply "line cards." In addition to such line cards, the line units 94BS through 94BZ also include sensor or scanning devices. Such scanning devices, sometimes simply called "scanners" or even generically referred to as "line circuits," electronically scan the lines associated with local loops 48BS through 48BZ in order to determine whether and when subscribers' respective telephone sets or modems are on or off the hook. Furthermore, along with such line cards and scanners, the line units 94BS through 94BZ also include other circuits and/or devices that together enable the line units 94BS through 94BZ to, for example, perform analog-to-digital (A/D) or digital-to-analog (D/A) voice signal conversions, provide overvoltage protection from lightning strikes, and perform loop transmission quality tests. In general, the line units 94BS through 94BZ along with their respective line cards, scanners, and other circuits and/or devices comprise a large cumulative part of the overall "line equipment" included within the switch module 68C. It is to be understood, however, that access interface units (AIUs) recently developed by Lucent Technologies Incorporated may alternatively be utilized with the switch module 68C instead of the more traditional line units 94BS through 94BZ.

In addition to the line units (LU) 94BS through 94BZ, the time slot interchanger (TSI) 98 is also set in electrical communication with the tandem trunk 36F, the direct trunk 34C, and the local trunk 52B via trunk units (TU) 96F, 96C, and 96B. The trunk units 96F, 96C, and 96B generally include printed circuit (PC) cards with ports wherein the trunks 36F, 34C, and 52B are received and physically terminated. These printed circuit cards within the trunk units 96F, 96C, and 96B are frequently referred to simply as "trunk cards." Along with such trunk cards, the trunk units 96F, 96C, and 96B also include other circuits and/or devices that together enable the trunk units 96F, 96C, and 96B to, for example, perform analogto-digital (A/D) or digital-to-analog (D/A) voice signal conversions, provide overvoltage protection from lightning strikes, perform trunk transmission quality tests, and provide signal amplification and/or repetition.

Within such a configuration, the time slot interchanger (TSI) 98 implements a digitally-based time-division switching scheme for "connecting" calls between any two (or sometimes more) of the line units (LU) 94BS through 94BZ and trunk units (TU) 96F, 96C, and 96B. Such call-connecting is primarily and cooperatively dictated in "real time" by the switch module processor unit (SMPU) 118, the communications module (CM) 70, the administrative module (AM) 80, and the main memory (MM) 90. To accomplish such call-connecting, the time slot interchanger 98, itself a solid-state device, generally includes, for example, input terminals, output terminals, at least one memory chip serving as an input buffer, at least one memory chip serving as an output buffer, a microprocessor chip serving as a controller, and a "map" that dictates which input terminals are to be "connected" to which output terminals. During operation, the time slot interchanger 98, for example, receives an analog-to-digital converted voice signal from an input terminal and temporarily stores it in a corresponding input buffer. The controller then refers to the map to thereby determine which output buffer the converted voice signal is to be delivered. Once delivered to the appropriate output buffer as dictated by the map, the converted voice signal is thereafter communicated to a buffer-corresponding output terminal whence the voice signal can be reconverted back to an analog voice signal as necessary.

As further illustrated in FIG. 4, the switch module processor unit (SMPU) 118, in turn, primarily includes a pool 100 of special-function printed circuit (PC) cards 102A through 102E, a plurality of various microprocessor (μP) chips particularly including chips 114A and 114B, and a plurality of various memory (MEM) chips particularly including chips 116A and 116B mounted thereon. The switch module processor unit 118, in sum, essentially serves as an "intelligent shelf" that contains most of the sophisticated electronics within the switch module 68C. As such, the switch module processor unit 118 cooperates with the time slot interchanger (TSI) 98 to thereby successfully process and connect calls as dictated by the communications module (CM) 70, the administrative module (AM) 80, and the main memory (MM) 90.

Each of the special-function printed circuit (PC) cards 102A through 102E that is mounted on the switch module processor unit (SMPU) 118 includes various electronic devices and/or circuitry. Such electronic devices and/or circuitry operate to, for example, decode dual-tone multiple frequency (DTMF) tones (i.e., dialed phone numbers) received from subscribers' telephone sets or modems, trigger the ringing of subscribers' telephone sets, and generate busy signals when appropriate for callers utilizing subscribers' telephone sets. In addition to such electronic devices and/or circuitry, each of the special-function printed circuit cards 102A through 102E also includes a system 130 according to the present invention. That is, the special-function printed circuit cards 102A through 102E have corresponding systems 130A through 130E according to the present invention that are situated and directly mounted onto the printed circuit cards 102A through 102E themselves.

According to the present invention, each of the systems 130A through 130E includes both a dial tone generator 104 and an electronic circuit 106 along with interface circuitry 112. The dial tone generator 104, first of all, primarily includes an oscillator circuit 108 for generating a signal suitable for ultimately producing an audible dial tone within the receiver 22 of a subscriber's telephone set 10 or modem. In central offices within North America, for example, the oscillator circuit 108 is preferably designed or tuned to produce an unbroken, oscillating (i.e., analog) electrical signal having a signal frequency within the conventional range of about 350 to 440 hertz (Hz). Outside North America, or within a private telephone network setting, the oscillator circuit 108 may alternatively be designed to produce signals oscillating at frequencies within other frequency ranges.

In addition to the dial tone generator 104, the electronic circuit 106 of the system 130, in turn, primarily includes a memory 110. The memory 110 is preferably an electronic memory suitable for storing a predetermined and/or prerecorded audible information message in digital format. Such a predetermined and/or pre-recorded audible information message may include one or more of the follow-ing: human-intelligible words, symbolic sounds or tones, and music. The electronic memory itself may particularly include, for example, one or more read-only memory (ROM) chips and/or random-access memory (RAM) chips. Although such an electronic memory is generally preferred, it is to be understood that alternative and/or supplemental memory storage means or devices may also be utilized pursuant to the present invention. Such alternative and/or supplemental memory storage means or devices may include, for example, a magnetic tape, a magnetic floppy disk, a magnetic hard disk, an optical disc, a floptical disk, a magneto-optical disk, et cetera. To accommodate such memory storage means or devices, however, the electronic circuit 106 situated on a given special-function printed circuit (PC) card 102 may additionally require a memory storage drive included thereon.

As illustrated in FIG. 4, the interface circuitries 112A through 112E are all electrically conductive circuits that are in direct electrical communication with both the dial tone generators 104A through 104E and the electronic circuits 106A through 106E. Each of the interface circuitries 112A through 112E, along with each of the dial tone generators 104A through 104E and each of the electronic circuits 106A through 106E, is specifically mounted on one of the special-function printed circuit (PC) cards 102A through 102E included within the pool 100. Within such an arrangement, the interface circuitries 112A through 112E are thereby capable of setting both the dial tone generators 104A through 104E and the electronic circuits 106A through 106E in switchable communication with (1) the telephone sets 10BS through 10BZ within residences 38BS through 38BZ, (2) the electronic telephone sets 54A through 54J associated with the private branch exchange (PBX) 50 within the business building 40, and/or (3) the internal modem associated with the facsimile (fax) machine 58 within the business building 40. Establishing such switchable communication is made possible via the line units (LU) 94BS through 94BZ, the trunk unit (TU) 96B, the local loops 48BS through 48BZ, the local trunk 52B, the dedicated line 60, the private branch exchange 50, and/or the extension lines 56A through 56J.

In general, with respect to the structure of the present invention, it is to be understood that any other switching systems or switch modules (SMs) situated within the local exchanges or central offices (COs) of the telephone network 28 in FIG. 1 may be configured, as is the switch module 68C, to similarly include at least one system 130 according to the present invention. Furthermore, it is also to be understood that any private branch exchange (PBX) within the telephone network 28, including the private branch exchange 50 in FIG. 1, may also be configured to similarly include at least one system 130 according to the present invention. For example, in the pool of one or more special-function printed circuit (PC) cards mounted within the cabinet of the private branch exchange 50, each printed circuit card may individually include a system 130 mounted thereon. As mounted, each system 130 is set in switchable communication with the electronic telephone sets 54A through 54J via the backplane, the line interface units (LIUs) with line cards, the various connectors, and the extension lines 56A through 56J associated with the private branch exchange 50.

As briefly alluded to hereinabove, each memory 110 included within a system 130 according to the present invention is suitable for storing a predetermined and/or pre-recorded audible information message in digital format. Such a predetermined and/or pre-recorded audible information message may generally include, for example, human-intelligible words, symbolic sounds or tones, music, or any combination thereof. Given the aforementioned arrival of new start-up local telephone companies within many local telephone markets, each memory 110 included within a system 130, which is situated in the central office of a given public or local exchange, may easily be suited to store an audible information message that is particularly a branding-type message. In this way, different providers of local telephone service at different public or local exchanges can successfully identify themselves to callers and telephone service subscribers. As a result, an accurate association of local telephone service with a particular provider is thereby facilitated.

Such a branding-type audible information message, in accordance with the present invention, can be created in various audible formulations. For example, if the telephone company SBC (Southwestern Bell Corporation) Communications Incorporated (hereinafter "SBC") owned the central office of a given local exchange through one of its regional subsidiary companies, each memory 110 included within a system 130 situated at that particular local exchange could be programmed to store a brandingtype audible information message such as "Powered by SBC." In addition to merely utilizing human-intelligible words, such a branding-type audible information message may also include music such as, for example, music in a commercial jingle that positively identifies SBC as being the local telephone service provider. Furthermore, such a branding-type audible information message may even include symbolic sounds or tones that function as an audible trademark or service mark somewhat similar to, for example, the audible NBC (National Broadcasting Company) chimes or the audible Intel (Integrated electronics) Inside™ tones aired on both television and radio.

As briefly alluded to earlier hereinabove, a system 130 with a memory 110 storing an audible information message, in addition to being utilized within the central office of a public or local exchange, may also be incorporated and utilized within a private branch exchange (PBX). Thus, for example, if Acme Corporation (fictitious) were headquartered within the business building 40 of FIG. 1 and owned (or leased) the private branch exchange 50 situated therein, a pool of special-function printed circuit (PC) cards could be included within the cabinet of the private branch exchange 50 wherein each card included a system 130 according to the present invention. Furthermore, each such system 130 within the private branch exchange 50 could particularly include a memory 110 wherein a branding-type audible information message such as, for example, "Acme phone network" was stored.

Also, as briefly alluded to hereinabove, any memory 110 included within a system 130 according to the present invention may particularly include, for example, a read-only memory (ROM) chip, a random-access memory (RAM) chip, a magnetic tape, a magnetic floppy disk, a magnetic hard disk, an optical disc, a floptical disk, a magneto-optical disk, et cetera. To accommodate any one or more of such various memory storage means or devices, an appropriate socket or memory storage drive may need to be included on any special-function printed circuit (PC) card on which a system 130 with such a memory 110 is mounted. Ideally, any such memory 110 included within a system 130 situated at a given exchange should be easily reprogrammable and/or replaceable. In this way, if a local telephone service provider at a local exchange decides to modify the branding-type audible information message, or if the exchange falls under new ownership or control, the branding-type audible information message can easily be changed as desired. For example, if the memory 110 primarily comprises a read-only memory (ROM) chip, either the chip alone or the chip along with the specialfunction printed circuit card on which it is mounted can simply be replaced. If, on the other hand, the memory 110 primarily comprises either a random-access memory (RAM) chip or an erasable-programmable read-only memory (EPROM) chip, the chip itself can simply be reprogrammed instead of being altogether replaced. Furthermore, if the memory 110 primarily comprises an aforementioned tape, disk, or disc along with a compatible memory storage drive, then the tape, disk, or disc can simply be either (1) temporarily removed, then rewritten or rerecorded, and thereafter reinstalled within the drive or (2) altogether replaced with another tape, disk, or disc.

Ideally, the best time to communicate a branding-type audible information message to a caller is just after the caller takes the receiver of his telephone set off-hook. In this way, as the caller initially puts the receiver to his ear to listen for a dial tone before dialing a desired phone number, the caller is briefly informed or reminded of the identity of his local telephone service provider. In theory, adopting such an immediate branding timing scheme can be done in either of two ways. In the first way, as soon as a caller takes the receiver of his telephone set off-hook to make a call, the branding-type audible information message is initially played through the receiver, and then a dial tone is audibly communicated through the receiver. That is, the dial tone immediately follows up the playing of the complete branding-type audible information message. In the second way, as soon as a caller takes the receiver off-hook, both the branding-type audible information message and the dial tone are immediately communicated through the receiver together. That is, the branding-type audible information message is generally audibly superimposed over the dial tone for the duration of the message. Once the message ends, the dial tone alone is audibly communicated through the receiver.

In the embodiment disclosed by way of example herein, the aforementioned second way of adopting such an immediate branding timing scheme is implemented by each system 130. The reason for implementing such is because the second way has one or more inherent advantages associated therewith. In particular, should a modem that is set up to operate on a "wait for dial tone" (WFDT) basis take on the role of caller, as opposed to a human being taking on the role of caller, the aforementioned first way causes the modem to needlessly wait until the brandingtype audible information message is fully played before hearing a dial tone and dialing a desired phone number. As a result, the operating efficiency of the modem is effectively reduced. In contrast, in adopting the second way, a modem that operates on a WFDT basis is not forced to wait for the branding-type audible information message to be fully played out before commencing to dial a phone number. As a result, the operating efficiency of the modem is maintained.

With the adoption of such an immediate branding timing scheme wherein a branding-type audible information message is initially superimposed over a dial tone, there still looms, however, the potential problem of needlessly interfering with the operation of a modem that is set up to operate on a WFDT basis. For example, if a WFDT modem, associated with either a personal computer (PC) or a facsimile (fax) machine, were to initially take a phone line off-hook for the intended purpose of thereafter sending data signals through the phone line to an intended recipient, any branding-type audible information message that is initially superimposed over the audible dial tone may potentially interfere with the operation of the modem. In particular, the branding-type audible information message may inadvertently drown out or audibly mask the dial tone to such an extent that the WFDT modem is not able to properly detect or "hear" the dial tone while the message is being communicated. Consequently, the modem may become "confused" and therefore hang up the phone line or even become locked up. At the very least, if confused, the WFDT modem is likely to be forced to wait for the full duration of the message until a clear dial tone is eventually detected before dialing. As an ultimate result, in any of such cases, the operating efficiency of the modem is effectively compromised.

To prevent this potential problem of inadvertently drowning out the dial tone, the system 130 is designed such that each branding-type audible information message transmitted therefrom is ultimately communicated to a modem or the receiver of a telephone set in a whisperlike or low-decibel manner. That is, each branding-type audible information message is superimposed over the dial tone so that, first, the message can be heard and understood by a human caller and, second, the dial tone can be properly discerned by a WFDT modem should such a modem take on the role of caller. To accomplish such, it is generally preferred that the overall decibel level associated with the branding-type audible information message be purposely composed, formulated, or designed such that it is lower than the decibel level associated with the audible dial tone. In this way, a WFDT modem will properly "hear" the dial tone even while the branding-type audible information message is being simultaneously communicated. As a result, the modem can commence dialing as soon as the dial tone is communicated without having to needlessly wait through the duration of the audible information message. In addition to decibel level, it is to be understood, however, that other phonetic, acoustical, and/or electrical design factors may need to be tuned and tweaked within a given system or phone network as well in order to obtain an ideal and balanced superimposition of the audible information message over the dial tone. Such other design factors may include, for example, volume levels, loudness, pitch, frequency levels, acoustical decibel (dB) levels, electronic decibel (dB) levels, signal strength levels, carrier-to-interference (C/I) ratios, decibel levels referenced from 1 milliwatt (dBm), et cetera.

Given the above, if, for example, a caller within residence 38BS in FIG. 1 desires to utilize the telephone set 10BS to call someone on the telephone set 10BZ within residence 38BZ, the caller first takes the handset 14 with receiver 22 of the telephone set 10BS off-hook. Upon taking the receiver 22 of telephone set 10BS off-hook, a linemonitoring scanner dedicated to the local loop 48BS and situated within or exclusively associated with the line unit (LU) 94BS then electronically senses that the telephone set 10BS is off-hook. Upon sensing the off-hook condition, the scanner then communicates such to the switch module processor unit (SMPU) 118 so that any one of the special-function printed circuit (PC) cards 102A through 102E within the pool 100 that happens to be available (i.e., is not already being used) can quickly be selected. Upon selecting an available special-function printed circuit card 102, the card 102 is then electronically set in switchable communication with the telephone set 10BS. In this way, both the dial tone generator 104 and the electronic circuit 106 with memory 110 of the system 130 particularly mounted on the card 102 are thereby set in switchable communication with the receiver 22 of the telephone set 10BS as well. Once such switchable communication is successfully established, the oscillator circuit 108 of the dial tone generator 104 generates a signal suitable for producing an audible dial tone. Once the signal is generated, the signal is then transmitted, via the interface circuitry 112, the line unit 94BS, and the local loop 48BS, to the receiver 22 of the telephone set 10BS. Upon reaching the receiver 22, the signal is then converted into an acoustical soundwave, thereby ultimately producing an audible dial tone. At the same time that such an audible dial tone is being initially produced through the receiver 22, a prestored audible information message is obtained from the memory 110 of the electronic circuit 106 and transmitted, in the form of electrical signals, to the receiver 22 as well. In being transmitted to the receiver 22, the electrical signals are similarly routed via the interface circuitry 112, the line unit 94BS, and the local loop 48BS. Upon reaching the receiver 22, the electrical signals are then converted into acoustical soundwaves, thereby ultimately producing an audible information message. In this way, both an audible dial tone and an audible information message are simultaneously produced, at least initially, through the receiver 22 of the telephone set 10BS within earshot of the caller in residence 38BS. Once, however, the caller begins to dial the telephone number for the telephone set 10BZ within residence 38BZ by pressing the push buttons on the touch-tone pad 16 of the telephone set 10BS as sensed by the switch module processor unit 118, both the audible dial tone and the audible information message, if still being communicated, are effectively cut off. In this way, the specific telephone number dialed by the caller can be decoded, processed, and ultimately utilized to establish a call path connection to the telephone set 10BZ within residence 38BZ.

Recently, local service commissions have indicated that the overwhelming majority of telephone service subscribers within the United States should generally begin to receive dial tones in less than three seconds (3 secs) from the time their receivers are initially taken off-hook. That is, "dial tone delay" in the United States is generally intended to be less than three seconds. Harry Newton, Newton's Telecom Dictionary, p. 239, 19$^{th}$ edition (CMP Books, March 2003). In view of such, the system 130 according to the present invention is, by design, capable of being adapted to initiate the production of both an audible dial tone and an audible information message within three seconds from the time the receiver 22 is initially taken off-hook. See FIG. 5. Thus, if the central office (CO) 30B in FIG. 1 were owned, for example, by SBC, both an audible dial tone 126A and a single communication 128A of a branding-type audible information message such as "Powered by SBC" may initially be produced through the receiver 22 of the telephone set 10BS by a system 130 according to the present invention in a time frame suggested by Example 1 in FIG. 5. Moreover, with further regard to Example 1 in FIG. 5, it is important to note that the single communication 128A of the branding-type audible information message "Powered by SBC" is, also by design, quite brief in duration at approximately three seconds (3 secs). Such brevity is generally preferred so that the audible information message is fully communicated to a caller before the caller begins to dial.

Figure 5:
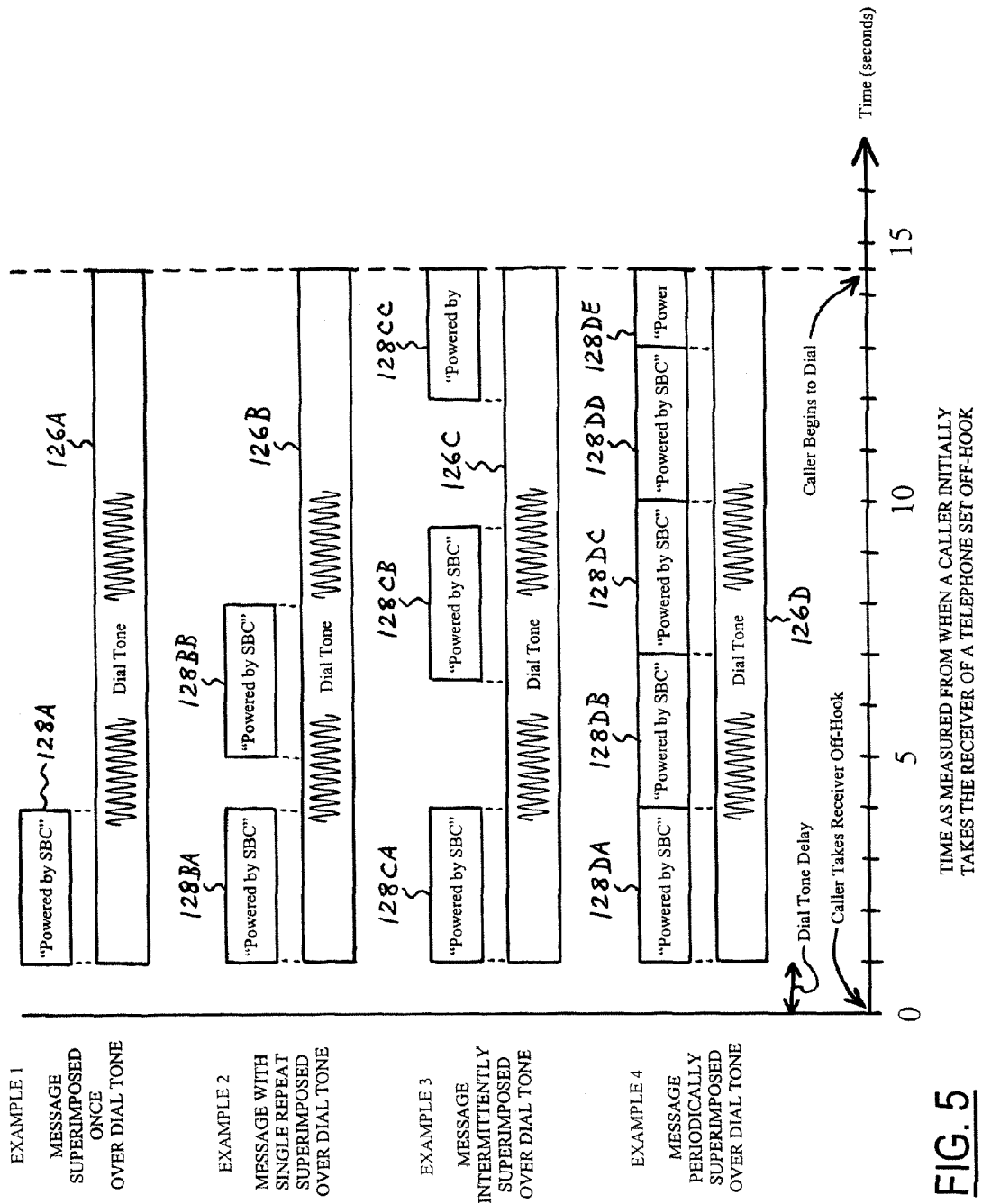
FIG. 5 is an illustration of various timing schemes that may be utilized in superimposing an audible information message over an audible dial tone according to various possible embodiments of the present invention.

As clearly illustrated by the examples in FIG. 5, timing schemes for producing a branding-type audible information message through the receiver of a telephone set can be widely varied according to the present invention. In general, a timing scheme should be adopted so that an audible information message is most likely to be fully communicated to a caller as the caller brings the receiver to his ear after initially taking the receiver off-hook. Hence, in Example 2, both an initial communication 128BA and a single follow-up (i.e., repeat) communication 128BB of the branding-type audible information message "Powered by SBC" are superimposed over the dial tone 126B. The single follow-up communication 128BB is included in this particular timing scheme just in case a caller happens to be a little slow in bringing the receiver to his ear after initially taking the receiver off-hook. Furthermore, in Example 3, an initial communication 128CA with periodic and intermittent repeat communications 128CB, 128CC, et cetera of the branding-type audible information message "Powered by SBC" are superimposed over the dial tone 126C. In this timing scheme, such continuous and intermittent repetition of the branding-type audible information message serves to better ensure that a caller hears the complete audible information message before dialing. Lastly, in Example 4, an initial communication 128DA with periodic and continuous (i.e., uninterrupted) repeat communications 128DB, 128DC, 128DD, 128DE, et cetera of the branding-type audible information message "Powered by SBC" are superimposed over the dial tone 126D. In this timing scheme, such continuous and uninterrupted repetition of the branding-type audible information message serves to even better ensure that a caller hears the complete audible information message before dialing. In view of Examples 1 through 4 in FIG. 5, therefore, it is to be understood that innumerable timing schemes for effectively communicating a given audible information message to a caller may indeed be adopted pursuant to the present invention.

As briefly mentioned earlier hereinabove, a system 130 according to the present invention may ideally be utilized to positively identify, and therefore distinguish, a local telephone service provider situated amongst other local telephone service providers within a crowded local telephone market. In this way, an accurate association of local telephone service quality with a particular provider can be created and maintained within the minds of local telephone service subscribers and users. With this in mind, if, for example, the central office (CO) 30A in FIG. 1 were owned by the ABC Telephone Company (fictitious) and the central office 30B were owned by SBC, these two closely situated local exchange carriers (LECs) (i.e., telephone companies) may each decide to include at least one system 130 within their respective switching hardware or switch modules to thereby distinguish and positively identify themselves to local telephone service subscribers. In particular, if a subscriber or caller were to pick up a receiver 22 from any of the telephone sets 10AA through 10AZ within residences 38AA through 38AZ, the system 130 included within the switching hardware associated with the central office 30A may superimpose a brandingtype audible information message such as "Serviced by ABC" over a dial tone. In contrast, if a subscriber or caller were to pick up a receiver 22 from any of the telephone sets 10BA through 10BZ within residences 38BA through 38BZ, the system 130 included within the switch modules associated with the central office 30B may instead superimpose a branding-type audible information message such as "Powered by SBC" over a dial tone. In this way, therefore, all subscribers or callers attempting to make phone calls from the closely situated residences 38AA through 38BZ in FIG. 1 are particularly informed or reminded of the actual identity of their respective local telephone service providers.

In addition to helping distinguish between local exchange carriers that own closely situated and yet separate central offices, a system 130 according to the present invention may also be utilized within a single central office that is being "shared" by an incumbent local exchange carrier (ILEC) and a competitive local exchange carrier (CLEC). In such a case, two separate pools of special-function printed circuit (PC) cards would ideally be included and maintained within the switching hardware of the single central office. In this way, for example, each individual card within the first pool would include a system 130 mounted thereon that is capable of superimposing a branding-type audible information message specifically identifying the ILEC over a dial tone. In contrast, each individual card within the second pool would include a system 130 mounted thereon that is capable of superimposing a branding-type audible information message specifically identifying the CLEC over a dial tone.

As also briefly mentioned earlier hereinabove, a system 130 is designed such that each branding-type audible information message transmitted therefrom is ultimately communicated to a modem or the receiver of a telephone set in a whisper-like or low-decibel manner. In this way, the potential problem of inadvertently drowning out the dial tone when a WFDT modem takes on the role of caller is avoided. Thus, for example, in FIG. 1, if the WFDT modem 44AA associated with the personal computer (PC) 42AA in residence 38AA were to take the local loop 48AA associated with the telephone set 10AA off-hook to send electronic data to the personal computer 42BA in residence 38BA, a branding-type audible information message such as "Serviced by ABC" that is both produced and superimposed over a dial tone by a system 130 situated within the central office (CO) 30A will not unduly interfere with the efficient operation of the modem 44AA. That is, the WFDT modem 44AA will properly "hear" the dial tone even while the branding-type audible information message "Serviced by ABC" is being simultaneously communicated. As a result, the WFDT modem 44AA can commence dialing as soon as the dial tone is communicated without having to needlessly wait through the duration of the branding-type audible information message. Similarly, if the WFDT modem 44BA associated with the personal computer 42BA in residence 38BA were to take the local loop 48BA associated with the telephone set 10BA offhook to send electronic data to the personal computer 42AA in residence 38AA, a branding-type audible information message such as "Powered by SBC" that is both produced and superimposed over a dial tone by a system 130 situated within the central office 30B will not unduly interfere with the efficient operation of the modem 44BA. That is, the WFDT modem 44BA will properly "hear" the dial tone even while the branding-type audible information message "Powered by SBC" is being simultaneously communicated. As a result, the WFDT modem 44BA can commence dialing as soon as the dial tone is communicated without having to needlessly wait through the duration of the branding-type audible information message.

Pursuant to the present invention, if the private branch exchange (PBX) 50 situated within the business building 40 in FIG. 1 were to include at least one system 130, operation of each system 130 within such a setting would generally occur as follows. For example, if a business employee initially picks up the receiver of the electronic telephone set 54A to call a fellow employee on the electronic telephone set 54J, the off-hook condition of the electronic telephone set 54A is immediately sensed by a linemonitoring scanner within the private branch exchange 50. Upon sensing the off-hook condition, the private branch exchange 50 then quickly selects an available special-function printed circuit (PC) card from a pool of such cards situated within the cabinet of the private branch exchange 50. After selecting an available special-function printed circuit card, the system 130 that is particularly mounted on the card then generates, transmits, and produces both an internal audible dial tone and an internal audible information message such as "Acme phone network" that is superimposed over the internal audible dial tone in the receiver of the electronic telephone set 54A. Upon hearing the internal audible dial tone along with the internal audible information message through the receiver, the business employee may then utilize the electronic telephone set 54A to dial an internal telephone number associated with the electronic telephone set 54J to thereby successfully establish an internal call connection to his fellow employee. In this particular example, the internal audible information message generally serves to inform or remind the calling business employee that he is merely connected to an internal exchange, that is, the private branch exchange 50, rather than an external or outside exchange such as the local exchange within central office (CO) 30B.

At this point, it is important to note that an internal audible information message communicated from a system 130 situated within a given private branch exchange (PBX) need not necessarily be a branding-type message according to the present invention. Furthermore, according to the present invention, any internal audible information message communicated from a system 130 situated within a private branch exchange also need not necessarily be superimposed over an internal audible dial tone in a whisper-like or low-decibel manner. The reason for such is because most WFDT modems are not connected within office settings to necessarily recognize an internal dial tone. As illustrated by the facsimile (fax) machine 58 with a WFDT modem in FIG. 1, most WFDT modems are instead connected within an office setting and particularly set up to exclusively "hear" and respond to an outside dial tone that is generated, transmitted, and produced by a local exchange, such as the local exchange within central office (CO) 30B.

Instead of making an internal phone call to a fellow employee, a business employee within the business building 40 in FIG. 1 may alternatively desire to make an external phone call to another person. For example, if the business employee takes the receiver of the electronic telephone set 54A off-hook to call a person on the telephone set 10BI within residence 38BI, the off-hook condition of the electronic telephone set 54A is immediately sensed by a line-monitoring scanner within the private branch exchange (PBX) 50. Upon sensing the off-hook condition, the private branch exchange 50 then quickly selects an available special-function printed circuit (PC) card from the pool of such cards situated within the cabinet of the private branch exchange 50. After selecting an available special-function printed circuit card, the system 130 that is particularly mounted on the card then generates, transmits, and produces both an internal audible dial tone and an internal audible information message such as "Acme phone network" in the receiver of the electronic telephone set 54A. In hearing the internal audible dial tone along with the internal audible information message through the receiver, the business employee is thereby informed or reminded that he has not yet established a connection to an outside or external local exchange. When the business employee thereafter singly presses the push button designated, for example, "9" (i.e., an outside access code) on the touch-tone pad of the electronic telephone set 54A, the private branch exchange 50 electronically decodes the associated dual-tone multiple frequency (DTMF) tones produced thereby. Thereafter, the private branch exchange 50 cooperatively arranges with the local exchange within central office (CO) 30B to have the local trunk 52B "grounded" and thereby seized so that the electronic telephone set 54A, via the extension line 56A, the private branch exchange 50, the local trunk 52B, and the trunk unit (TU) 96B, can be successfully connected to the local exchange within central office 30B.

Once connected to the local exchange within central office (CO) 30B in this manner, both the internal audible dial tone and the internal audible information message "Acme phone network" are promptly cut off by the private branch exchange (PBX) 50 from being further produced in the receiver of the electronic telephone set 54A. At about this same time, a trunk-monitoring scanner dedicated to local trunk 52B and situated within or exclusively associated with the trunk unit (TU) 96B in switch module (SM) 68C immediately senses that one of the lines associated with local trunk 52B is off-hook. Upon sensing the off-hook condition of one of the lines, the scanner then communicates such to the switch module processor unit (SMPU) 118 of switch module 68C so that any one of the specialfunction printed circuit (PC) cards 102A through 102E within the pool 100 that happens to be available can quickly be selected. After selecting an available special-function printed circuit card 102, the card 102 is then electronically set in switchable communication with the electronic telephone set 54A. In this way, both the dial tone generator 104 and the electronic circuit 106 with memory 110 of the system 130 particularly mounted on the card 102 are thereby set in switchable communication with the receiver of the electronic telephone set 54A as well. Once such switchable communication is successfully established, the oscillator circuit 108 of the dial tone generator 104 generates a signal suitable for producing an audible dial tone. After the signal is generated, the signal is then transmitted, via the interface circuitry 112, the trunk unit 96B, the local trunk 52B, the private branch exchange (PBX) 50, and the extension line 56A, to the receiver of the electronic telephone set 54A. Upon reaching the receiver, the signal is then converted into an acoustical soundwave, thereby ultimately producing an external audible dial tone through the receiver of the electronic telephone set 54A.

At the same time that such an external audible dial tone is being initially produced through the receiver of the electronic telephone set 54A, an external branding-type audible information message is obtained from the memory 110 of the electronic circuit 106 within the switch module (SM) 68C and transmitted, in the form of electrical signals, to the receiver as well. During transmission, the electrical signals are routed via the interface circuitry 112, the trunk unit (TU) 96B, the local trunk 52B, the private branch exchange (PBX) 50, and the extension line 56A. Upon reaching the receiver, the electrical signals are then converted into acoustical soundwaves, thereby ultimately producing an external branding-type audible information message such as "Powered by SBC." In this way, both an external audible dial tone and an external branding-type audible information message are simultaneously produced, at least initially, through the receiver of the electronic telephone set 54A. When the business employee hears the external audible dial tone and/or the external brandingtype audible information message through the receiver of the electronic telephone set 54A, the business employee then knows that the electronic telephone set 54A is successfully connected to a local exchange outside of the business building 40. Once, however, the business employee begins to dial the telephone number for the telephone set 10BI in residence 38BI by pressing the push buttons on the touch-tone pad of the electronic telephone set 54A as sensed by the switch module processor unit 118, both the external audible dial tone and the external branding-type audible information message, if still being communicated, are effectively cut off. In this way, the specific telephone number being dialed by the business employee can be decoded, processed, and ultimately utilized to establish a call path connection to the telephone set 10BI.

In addition to the embodiments described hereinabove, it is to be understood that a system 130, which generally includes both a dial tone generator and an electronic circuit having a memory storing an audible information message in digital format, may alternatively be adapted and situated in other locations within a given telephone network pursuant to the present invention. For example, such a system 130 according to the present invention may easily be adapted and operatively connected or fixed to a line card incorporated within a VoIP (Voice over Internet Protocol) gateway device for either a public or private packetbased VoIP telephone network or other packet-based IP (Internet Protocol) network. By way of illustration, in an IP long-distance wholesale call scenario, a caller desiring to call a non-local party via a particular VoIP telephone network may initially pick up the receiver of his telephone set and hear both an audible dial tone and a branding-type audible information message such as "Powered by SBC" communicated from a system 130 situated within the central office (CO) of his local telephone service provider. Upon hearing such, the caller may then begin to dial the local telephone number of a local VoIP gateway device associated with the VoIP telephone network, thereby causing both the audible dial tone and the branding-type audible information message communicated from the central office of his local telephone service provider to be cut off. Once the telephone number of the local VoIP gateway device is properly dialed, the local exchange within the central office then connects the caller's telephone set to the local VoIP gateway device. Upon doing so, the local VoIP gateway device then answers and requests entry of a user identification (UID or ID) code from the caller. After properly entering an authorized or acceptable user identification code on the touch-tone pad of his telephone set, a separate system 130 particularly incorporated within the local VoIP gateway device itself then communicates both a separate audible dial tone and an audible information message such as "Welcome to the IP Network, Please enter your party's number" to the caller. Upon properly entering the desired party's number on the touch-tone pad of his telephone set, the caller is then call-connected to the party via both the VoIP gateway device and its associated VoIP telephone network. In view of such a call scenario illustration, it is to be understood that a VoIP gateway device that includes a system 130 according to the present invention may, for example, be router-based, remote access concentrator (RAC) based, or even server-based. Furthermore, in addition to being situated within a VoIP gateway device, it is to be understood that a system 130 may also be adapted and situated within a given VoIP telephone network or other IP network to operate in conjunction with VoIP routers, VoIP telephone sets, Internet "smart" phones, IP Ethernet phones, and IP private branch exchanges (PBXs).

In addition to a VoIP telephone network, such a system 130 according to the present invention may also easily be adapted and operatively incorporated within the base unit of an ISDN (Integrated Services Digital Network) telephone set situated and connected within an ISDN-compatible public or private telephone network. Furthermore, a system 130 according to the present invention may also be adapted and easily incorporated within telephone networks that include, for example, Centrex systems, key systems, automatic call distributing (ACD) systems, various electronic or digital telephone sets, various proprietary telephone sets (for example, "P" phones), and DSL (Digital Subscriber Line) or broadband technologies.

Lastly, it is to be understood that audible information messages produced and communicated to a caller by a system 130 according to the present invention need not necessarily only be branding-type messages. On the contrary, a system 130 according to the present invention may alternatively communicate audible information messages regarding, for example, national or local advertising, local time, local temperature, local weather reports and forecasts with severe storm alerts or warnings, various local emergencies, greetings and access instructions from various network gateway devices, or the existence of retrievable messages saved and waiting in a voice mail or voice messaging system. With further regard to the last mentioned communicative alternative, an audible information message communicated from a system 130 may particularly be adapted to serve as a message notification means or a "message waiting indicator" (MWI). As such, the audible information message informs a caller as he initially picks up the receiver of his telephone set that he has one or more retrievable messages presently saved and waiting in his voice mail or voice messaging system. Utilizing the audible information message as a message notification means or a message waiting indicator is generally preferable over other modern message notification/indication schemes that utilize a stutter dial tone or an on/off "blinking" dial tone, for such stutter and blinking dial tones frequently interfere with the proper operation of WFDT modems associated with, for example, personal computers (PCs) or facsimile (fax) machines.

While the present invention has been implemented in various embodiments described herein, it is to be understood that the invention is not to be limited to such disclosed embodiments. On the contrary, the present invention is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method for communicating information to a caller on a telephone network, said method comprising:
   generating a signal suitable for producing an audible dial tone;
   transmitting said signal to the receiver of a telephone set, when said caller initially takes said receiver off-hook, to thereby produce said audible dial tone; and
   superimposing an audible information message over said audible dial tone while said audible dial tone is produced, wherein said audible dial tone has an associated decibel level and said audible information message has an associated overall decibel level such that said overall decibel level associated with said audible information message is lower than said decibel level associated with said audible dial tone.

2. The method of claim 1, wherein said caller is a human being or a modem.

3. The method of claim 1, wherein said telephone network includes at least one of a Public Switched Telephone Network, a Voice over Internet Protocol telephone network, an Integrated Services Digital Network compatible telephone network, or a private telephone network.

4. The method of claim 1, wherein said signal suitable for producing an audible dial tone is an oscillating electrical signal.

5. The method of claim 1, wherein generating the signal is accomplished with a dial tone generator comprising an oscillator circuit.

6. The method of claim 1, wherein said telephone set is an analog telephone set, an electronic telephone set, a digital telephone set, a Voice over Internet Protocol telephone set, an Integrated Services Digital Network telephone set, or a proprietary telephone set.

7. The method of claim 1, wherein transmitting the signal is at least partially accomplished with at least one transmission means selected from the group consisting of a local loop, a trunk, and an extension line.

8. The method of claim 1, wherein superimposing is at least partially accomplished with an electronic circuit having a memory storing said audible information message in digital format.

9. The method of claim 1, wherein superimposing is executed and repeated periodically.

10. The method of claim 1, wherein superimposing is executed and repeated intermittently.

11. The method of claim 1, wherein said audible information message includes human-intelligible words.

12. The method of claim 1, wherein said audible information message has the characteristic of being whisper-like.

13. The method of claim 1, wherein said audible information message is a branding-type message that identifies a provider of local telephone service.

14. The method of claim 1, wherein said audible information message includes symbolic sounds serving to identify a provider of local telephone service.

15. The method of claim 1, wherein at least one of generating, transmitting, and superimposing is executed at a public local exchange or a private branch exchange.

16. The method of claim 1, wherein said telephone set is an Integrated Services Digital Network telephone set.

17. The method of claim 1, further comprising:
   generating the signal after said caller initially takes said receiver off-hook.

18. A method for communicating information to a caller on a telephone network, said method comprising:
   generating a signal suitable for producing an audible dial tone;
   transmitting said signal to the receiver of a telephone set, when said caller initially takes said receiver off-hook, to thereby produce said audible dial tone; and
   superimposing an audible information message over said audible dial tone while said audible dial tone is produced;
   wherein said audible dial tone has an associated decibel level and said audible information message has an associated overall decibel level such that said overall decibel level associated with said audible information message is lower than said decibel level associated with said audible dial tone; and
   wherein said audible information message is a branding-type message that identifies a provider of local telephone service.

19. The method of claim 18, wherein the telephone network comprises a Voice over Internet Protocol (VoIP) network.

20. The method of claim 1, wherein the audible dial tone is capable of being recognized by a wait for dial tone modem so that the wait for dial tone modem can commence dialing.

* * * * *